United States Patent

Nelson et al.

[15] 3,675,022

[45] July 4, 1972

[54] KERR CELL SYSTEM FOR MODULATING A LASER BEAM

[72] Inventors: Melvin A. Nelson; Jerry G. Lackey; Terence J. Davies, all of Santa Barbara, Calif.

[73] Assignee: The United States of America as represented by the United States Atomic Energy Commission

[22] Filed: May 21, 1970

[21] Appl. No.: 39,345

[52] U.S. Cl. .............................. 250/199, 350/161
[51] Int. Cl. ........................................ H04b 9/00
[58] Field of Search ............... 250/199; 332/7.51; 340/189, 340/332; 350/150, 151, 160, 161

[56] References Cited

UNITED STATES PATENTS

| | | | |
|---|---|---|---|
| 3,408,593 | 10/1968 | Hurvitz | 350/150 |
| 3,387,909 | 6/1968 | Anderson et al. | 250/199 |
| 3,519,328 | 7/1970 | Grossman | 250/199 |
| 3,518,436 | 6/1970 | De Maria et al. | 250/199 |

Primary Examiner—Albert J. Mayer
Attorney—Roland A. Anderson

[57] ABSTRACT

The electro-optical telemetr system of the present invention includes a laser, polarizer and analyzer elements and a Kerr cell modulator containing a parallel plate transmission line immersed in a birefringent liquid such as nitrobenzene. The modulating signal is applied to the parallel plate transmission line which is terminated in its characteristic impedance. Preferably, the laser beam is directed into the modulator at an angle equal to $$\cos^{-1} \frac{n}{\sqrt{e}}$$

where $n$ and $e$ are the index of refraction and the dielectric coefficient, respectively, of the birefringent liquid. Two parallel mirrored surfaces may be used to make the laser beam traverse the modulator a plurality of times. An environmental chamber containing a liquid bath and a thermo-electrical control system may be utilized to maintain the temperature of the modulator at a predetermined point. The Kerr cell modulator may also be biased by a bias voltage provided by a high voltage bias supply controlled by a feedback system utilizing another laser.

1 Claim, 16 Drawing Figures

INVENTORS
MELVIN A. NELSON
JERRY G. LACKEY
TERENCE J. DAVIES

BY
ATTORNEYS $$\frac{V}{V_m} = \left(\frac{d^2}{2KNLV_m^2}\right)^{1/2}$$

WHERE d = PLATE SPACING
L = SINGLE-PASS OPTICAL-PATH LENGTH
K = KERR COEFFICIENT
N = NUMBER OF PASSES
$V_m$ = SINGLE-PASS HALF WAVE VOLTAGE

KERR CELL SYSTEM FOR MODULATING A LASER BEAM

The invention described herein was made in the course of work under Contract No. AT(29-1)-1183 with the U. S. Atomic Energy Commission.

SUMMARY OF THE INVENTION

The present invention relates to telemetry systems and in particular to an optical system utilizing a Kerr cell system of unique design for modulating a laser beam. The system is unique in the arrangement of a laser transmitter, Kerr cell modulator, telescope receiver and electronic recorder system. The objectives have been to design a modulator having wider bandwidth than conventional devices, lower operating voltage, and impedance-matched electrical structure.

BACKGROUND OF INVENTION

Existing Kerr-effect electro-optical modulators are not constructed in a manner that permits the full utilization of their bandwidth capabilities for high-speed pulse of pulse-interval measurements. This is because commercial cells are designed primarily for high-speed photograph and optical switching applications. The cells are generally highly capacitive and, as such, are limited in frequency response. Their mechanical design does not permit proper impedance match to the signal cable. This generates signal reflections within the cell which distort the modulating signal. Thus, an object of the present invention is to minimize insofar as possible the effects of the impedance mis-match problem.

Essentially, a Kerr cell designed for wideband operation should appear electrically as a section of the transmission line over which the signal voltage is propagated. If ultimate bandwidth is to be achieved, the electromagnetic modulating signal wave must propagate through the modulator at the same velocity as the optical beam so that any given increment of the optical beam that is being modulated will be influenced by the same increment of modulating voltage as it passes through the cell and hence will be directly modulated in relation to a specific segment of the modulating voltage. Moreover, the modulating field in the cell should be uniform and everywhere perpendicular to the optical beam.

The parallel-plate transmission-line configuration best meets these criteria. Other geometries, such as the coaxial line and strip-transmission line are unsuitable. For example, the coaxial line (1) possesses an excessively high modulating-voltage requirement since the half-wave voltage is so high, (2) is unadaptable to optical-beam folding techniques which reduce the half-wave voltage and (3) has a non-uniform and non-perpendicular electric field relative to the optical beam. A strip transmission line would require (1) an impractically small strip, resulting in a non-uniform electric field, and (2) a strip-to-ground plane spacing too small for practical optical beam diameters.

The distinctive features and purposes of the present invention will in part be emphasized and in part become apparent upon perusal of the following detailed description of the principles utilized and preferred embodiments as illustrated in the accompanying drawings in which:

FIG. 1 illustrates schematically and in perspective a Kerr cell modulation scheme useful in explaining the principles underlying the invention;

FIG. 2 graphically shows the response to a single wavelength of light of a Kerr cell modulator of the type utilized in the system of the present invention;

FIG. 3 illustrates a graph that is useful in explaining biasing of the Kerr cell modulator;

FIG. 4 graphically shows the response of a Kerr cell modulator to multiple wavelengths in a laser beam;

Figure 1:
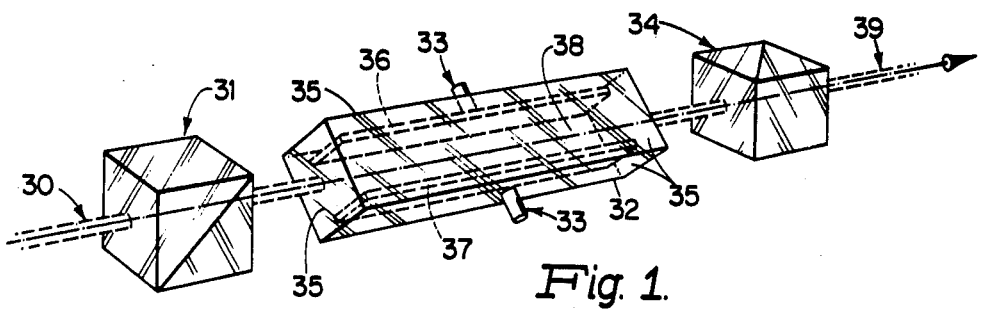

Referring to FIG. 1, the essential elements in a Kerr cell system for modulating laser beam 30 are polarizer 31, electro-optical light modulator 32 having modulating signal input terminals 33 and analyzer 34. In such systems, polarizer 31 and analyzer 34 are usually Glan prisms because of their high optical transmission and their high degree of polarization selectivity where the incident light has low beam divergence. For example, an optical transmission as high as 0.8 can be obtained with the prism planes of polarization adjusted to be coincident, and a transmission as low as $1 \times 10^{-5}$ can be achieved with carefully adjusted, crossed polarizers. The high contrast ratio that these transmissions yield makes possible a large intensity resolution.

Electro-optical light modulator 32 employs a small container, usually glass, with optically polished strain-free windows 35. Internally, it contains two flat metal plate electrodes 36 and 37, immersed in and separated by dielectric liquid 38 that exhibits a property known as the Kerr effect. The larger the Kerr effect of the dielectric liquid, the smaller will be the voltage required on electrodes 36 and 37 to cause a given change in the intensity of light passed through it. Nitrobenzene liquid has one of the highest Kerr coefficients of any liquid.

Application of an electric field across electrodes 36 and 37, causes dielectric liquid 38 to become birefringent. If modulator 32 is properly oriented and polarizer 31 and analyzer 34 have been crossed for minimum transmission, the birefringence induced in dielectric liquid 38 causes incident laser beam 30 to be transmitted through the system in proportion to the amplitude of the applied voltage. The voltage at which the intensity of light output 39 first increases to a maximum is called the half-wave voltage of modulator 32. At higher applied voltages, the intensity of light output 39 decreases and then increases cyclically in accordance with the following relationship (for a specific frequency of monochromatic light):

$$\frac{i}{I_0} = \sin^2 \frac{\pi}{2} \left[ \frac{v(t)}{V_m} \right]^2 \quad (1)$$

where
$i$ = instantaneous light output
$I_0$ = maximum output intensity
$v(t)$ = instantaneous signal voltage across modulator 32
$V_m$ = cell half-wave voltage Equation (1) describes the nonlinear response of modulator 32. It is plotted as curve 40 in FIG. 2, where the voltage axis is normalized relative to the half-wave voltage of modulator 32, and the intensity axis is normalized relative to the maximum and minimum transmitted intensities.

Figure 2:
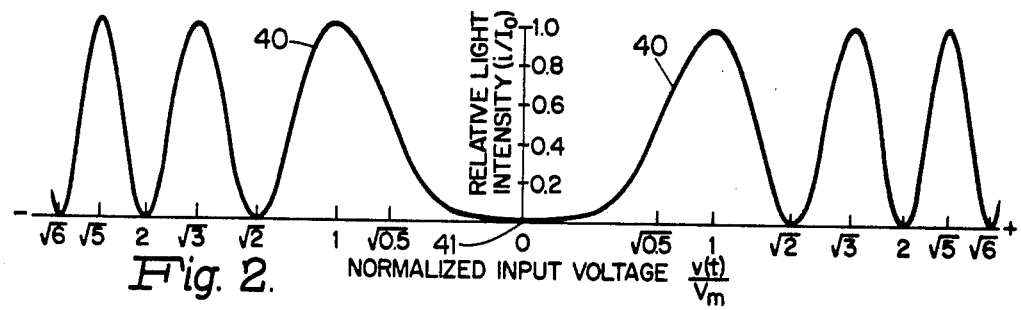

As shown in FIG. 2, minimum light transmission occurs when $[v(t)/V_m]^2 = 0, 2, 4 \ldots n$. Maximum light transmission occurs when $[v(t)/V_m]^2 = 1, 3, 5 \ldots n$.

Light beam 39 transmitted by the Kerr cell system of FIG. 1 may be detected by any of several types of photodetectors, including an image converter camera. When a photomultiplier or photodiode detector is used, its electrical output is often recorded on an oscilloscope. If the voltage signal applied to electrodes 36 and 37 has the shape of a linearly increasing ramp, then an oscilloscope display of the photodetector signal looks like one-half of curve 40 of FIG. 2 starting at zero-voltage origin 41 going left or right, depending on the signal polarity. The maximum peak-to-peak deflection amplitude of the oscilloscope display depends on the combination of the intensity of the optical carrier beam at the photodetector, the optical sensitivity of the detector, and the deflection sensitivity of the oscilloscope. Note that once the display is adjusted for optimum deflection, it is always on scale regardless of the amplitude of the voltage applied to modulator 32. Only a change in the transmissivity of the optical path between modulator 32 and the photodetector will change the deflection amplitude. Also, measurement accuracy is not directly dependent upon the deflection amplitude. Each extreme of the display represents a known voltage at the modulator.

In many measurement applications, it is desirable to apply a dc bias voltage ($V_B$) to electrodes 36 and 37 before a data signal is applied. Application of the bias voltage increases the modulator sensitivity at low signal levels. The transfer function then follows the relation:

$$\frac{i}{I_o} = \sin^2 \frac{\pi}{2} \left[ \frac{v(t) + V_B}{Vm} \right]^2 \qquad (2)$$

Figure 3:
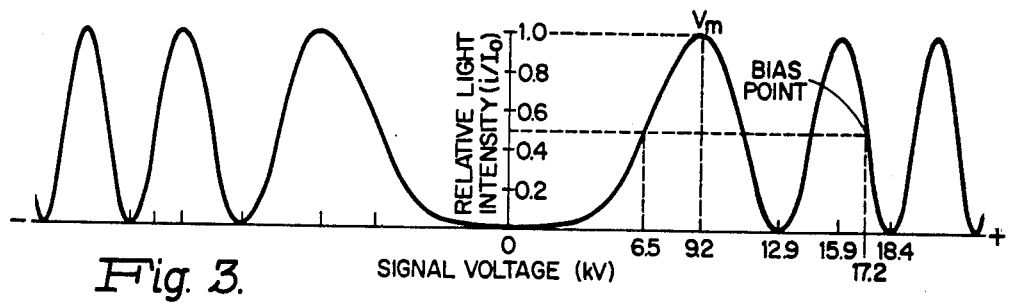

This illustrates that under bias conditions, the signal voltage adds to or subtracts from the bias voltage (depending on the relative polarities), and light modulation occurs from the bias point of operation along response curve 40. For example, the transfer function illustrated in FIG. 3 shows that modulator 32 had a half-wave voltage of 9.2 kV. The cell was biased to +17.2 kV, as shown.

Note that the signal voltage required to change the light intensity a specific amount from the 0.5 relative-intensity value where the bias is +17.2 kV is smaller than would be needed if the cell were biased at, for instance, 6.5 kV. This property of increased sensitivity at a low signal voltage level is particularly useful for those signals in which the rate of rise increases during the measurement interval. At high signal voltages, where the input may be rising very rapidly, the modulator response exhibits less sensitivity. In combination with the previously described on-scale display for all signal amplitudes, this property makes possible a wide-dynamic-range measurement with excellent resolution over the full dynamic range.

Other important considerations for modulator 32 are its capacitance, frequency response, spectral properties and temperature behavior. Electrical capacitance is important because it affects the bandwidth of modulator 32 according to the relation $\tau = RC$, where $\tau$ is the modulator time constant, $R$ is the parallel impedance of the input signal transmission line and the load impedance, and $C$ is the modulator electrical capacitance. For example, in one system used, $R$ was 25 ohms, $C$ was about 35 pF and the system time constant was 0.875 nanosecond, which is equivalent to a modulator bandwidth greater than 200 MHz. Ultimately, response may be limited by the molecular properties of the dielectric liquid 38. For nitrobenzene, this limit is in the gigahertz region.

Figure 4:
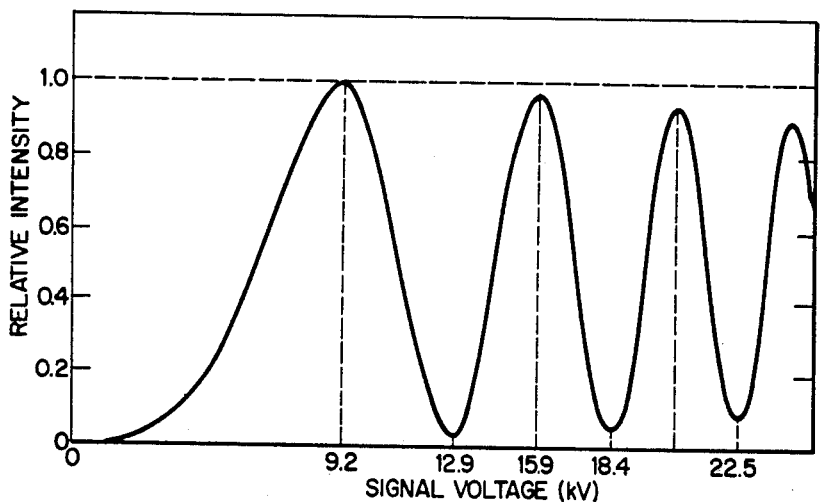

Modulators 32 utilizing nitrobenzene as a dielectric are useable at optical wavelengths from approximately 4,500 angstroms into the near infrared. However, their half-wave voltage depends on the optical wavelength. If second-order effects are neglected, the half-wave voltage squared is proportional to the optical wavelength. That is, $V_m{}^2 \infty \lambda$. This wavelength dependence must be considered where a multi-wavelength laser beam 30 is used. For example, one argon-ion laser produces a beam 30 composed of light at the following six principal wavelengths (lines): 5,145, 5,017, 4,965, 4,881, 4,765 and 4,579 angstroms. The modulator transfer function for this laser beam 30 is shown in FIG. 4. The transmitted intensity $i$ may be represented by the sum:

$$i = \sum_{m=1}^{6} I_m \sin^2 \frac{\pi}{2} \left[ \frac{v(t) + V_B}{Vm} \right]^2 \qquad (3)$$

where $V_B$ is again the bias voltage and $V_m$ is the half-wave voltage of modulator 32 for each light wavelength $m$. The relative intensity of each line of laser beam 30 is represented by $I_m$. For a particular instantaneous value of modulating signal voltage $v(t)$, therefore, the intensity of the transmitted optical signal 39 that is detected and recorded at the receiver is $i$. The modulating signal voltage $v(t)$ is recovered from the recorded data by a process of iteration, using the multi-wavelength transfer function.

Figure 5:
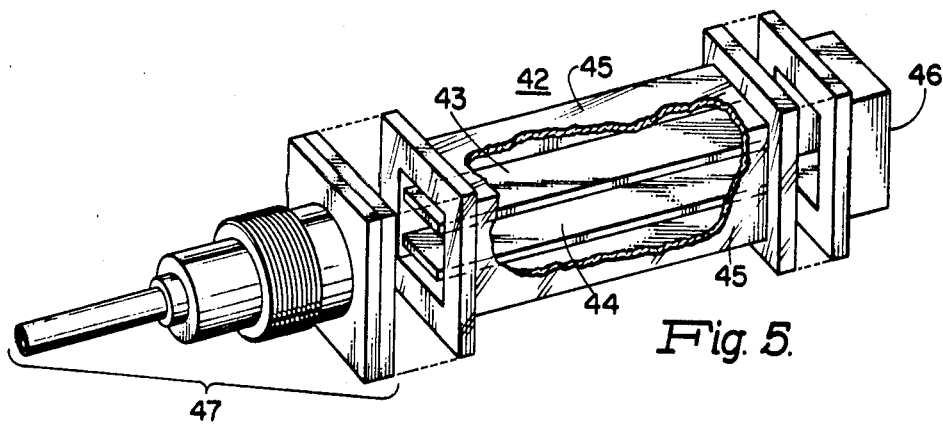
FIG. 5 illustrates a perspective view, partially exploded and broken away, of another embodiment of a Kerr cell modulator.
Figure 6:
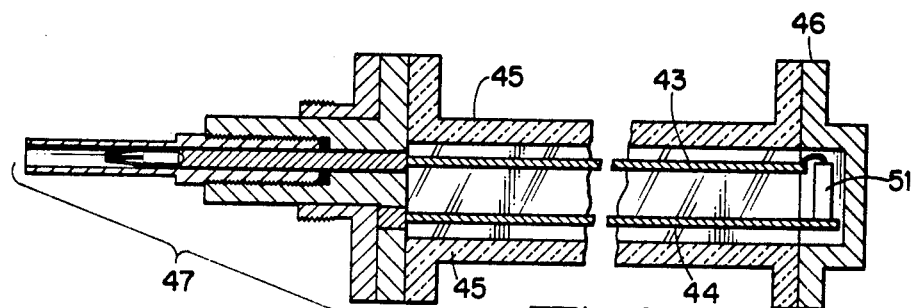
FIG. 6 shows a partial sectional view of the modulator of FIG. 5.

The parallel plate configurations illustrated in FIGS. 5 and 6 comprise parallel plates 43 and 44, optically polished strain-free windows 45, end cap 46 and an input section 47, here illustrated as the male part of a connector to which the signal cable can be connected.

As stated hereinabove, ultimate bandwidth response of the modulator requires that the velocity of the electromagnetic wave match the velocity of the optical wave. This is achieved by arranging the directions of propagation as shown by vectors $\vec{V}$em (electromagnetic) and $\vec{V}$opt (optical) in FIG. 7. The optical phase velocity V opt of light in nitrobenzene is given by $$V\text{opt} = (1/n) Vo \qquad (4)$$

where
$Vo$ = velocity of light in vacuum
$n$ = index of refraction of nitrobenzene.

The electromagnetic phase velocity $V$ em in nitrobenzene is given by $$Vm = \frac{1}{\sqrt{\epsilon}} V \qquad (5)$$

where $\epsilon$ = dielectric coefficient of nitrobenzene.
Then, from FIG. 7, a phase-matched condition exists in the $x$ direction when $$\vec{V}\text{em} = \vec{V}\text{opt}_x \qquad (6)$$

where
$$\vec{V}\text{opt} = \vec{V}\text{opt}_x \text{ and } \vec{V}\text{opt}_y \qquad (7)$$
or
$$V\text{em} = V\text{opt} \cos \alpha \qquad (8)$$

Thus, the required angle for phase matching can be written as $$\alpha = \cos^{-1} \frac{V\text{em}}{V\text{opt}} = \cos^{-1} \frac{n}{\sqrt{\epsilon}} \qquad (9)$$

Thus, $\alpha$ is approximately equal to 75° for pure nitrobenzene and is less than 75° for impure nitrobenzene.

Figure 7:
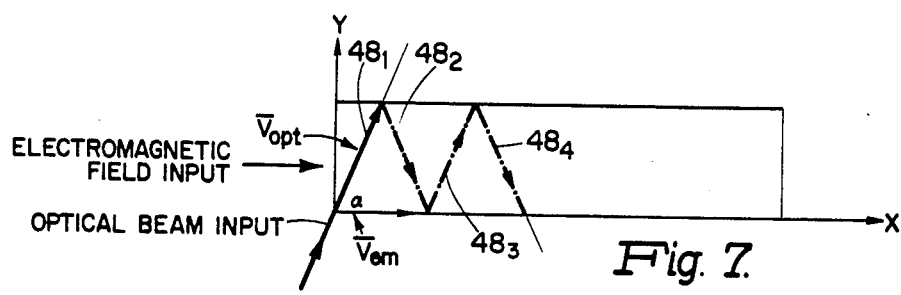
FIG. 7 illustrates vectorially the optical and electromagnetic phase velocities in the unique arrangement utilized to match the velocity of propagation of the electromagnetic and light waves through the Kerr cell modulator.
Figure 8:
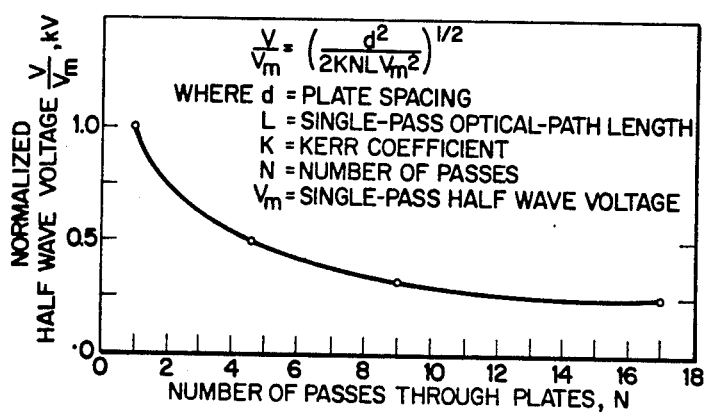
FIG. 8 illustrates how the half-wave voltage of a parallel-plate Kerr cell modulator decreases with increasing numbers of reflections of the optical beam therethrough.

Optical folding means reflecting the optical beam back and forth between the parallel plates, is shown by dotted lines 48 in FIG. 7. A single-pass optical-path length is the distance the light beam travels through the nitrobenzene before being reflected or exiting. Thus, in FIG. 7 the paths designated $48_1$, $48_2$, $48_3$ and $48_4$ are each single-pass optical-path lengths. The graph of FIG. 8 illustrates how the half-wave voltage $V_m$ decreases for a constant geometry with increasing numbers of single-pass optical-path lengths.

Figure 9:
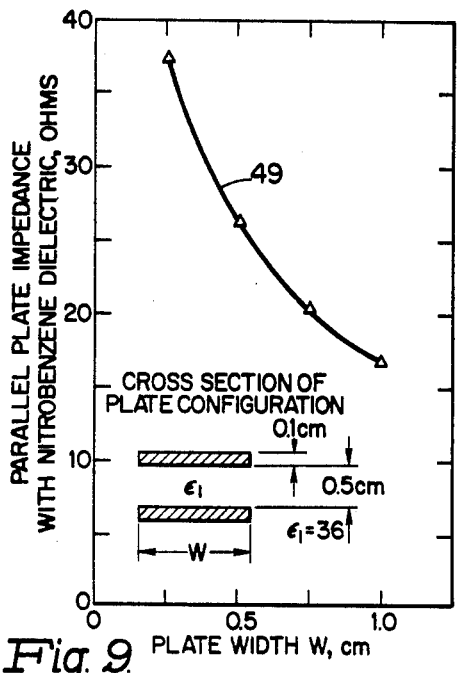
FIG. 9 illustrates the variation in measured impedance of a parallel-plate Kerr cell modulator with plate width.
Figure 10:
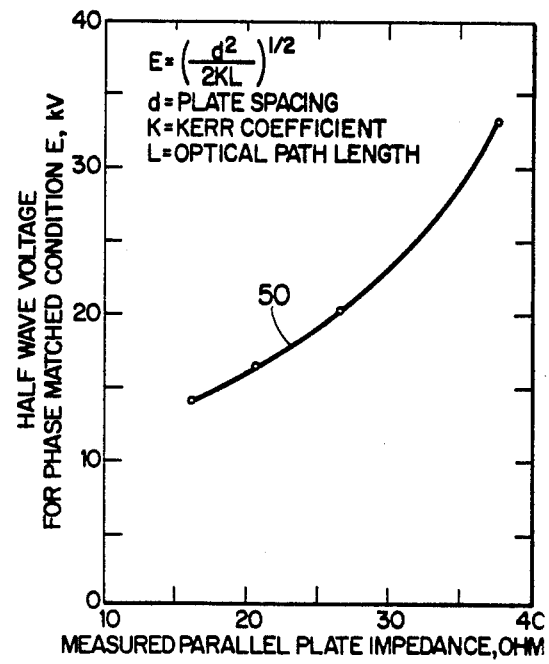
FIG. 10 illustrates the variation in half wave voltage with the impedances of the modulators of FIG. 9.

Curve 49 of FIG. 9 illustrates an example of measured impedance of a parallel-plate Kerr cell configuration as the width of the plates was varied. Curve 50 of FIG. 10 shows the corresponding half-wave voltages. Consideration of curves 49 and 50 indicates that the design impedance range of parallel-plate Kerr cell modulators is lower than the characteristic impedance of available coaxial cables. The reason for this is that, if the cell geometry is modified to increase its impedance to, say, 40 ohms, then the magnitude of the half-wave voltage will rapidly increase to intolerable values.

Since the signal cables used usually will have a characteristic impedance of 50 ohms, it will be apparent that an impedance mismatch will occur at connector input section 47 of FIG. 6. If the parallel plates of the cell are terminated in the cell's characteristic impedance such as resistor 51, this condition can be tolerated because reflections at connector input section 47 are reflected back down the input signal cable, but do not have multiple reflections within the cell itself.

It will be noted, with respect to FIG. 5, that the fringing effect at the edges of plates 43 and 44 is reduced by bringing the glass side walls 45 into close proximity to the edges of the plates. Since the glass has a lower dielectric constant than the nitrobenzene surrounding plates 43 and 44, the electromagnetic field lines of force bend away from the lower dielectric material. The net effect is a compression of the electromagnetic field lines of force into the volume between plates 43 and 44.

Figure 11:
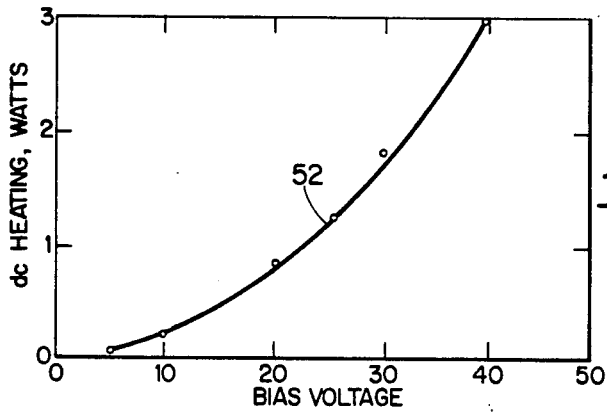
FIG. 11 shows a graph of the ohmic heating caused by biasing one embodiment of a parallel plate Kerr cell modulator.

The response of nitrobenzene Kerr cells with parallel plate electrodes is sensitive to the temperature of the cell. Hence, it is necessary to consider the ohmic heating that will be produced by biasing the cell. In one embodiment plate spacing was 0.5 cm, plate width was 0.57 cm and plate length was 15 cm. Curve 52 of the graph of FIG. 11 illustrates the ohmic heating of this embodiment at various biasing voltages.

Figure 12:
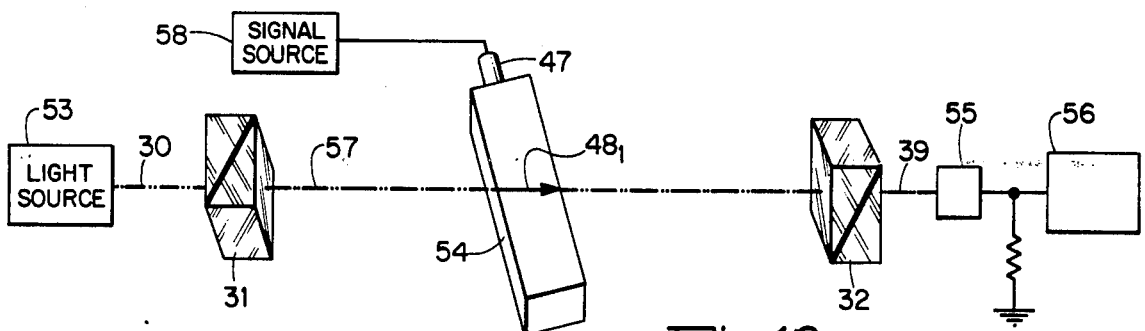
FIG. 12 illustrates schematically and in partially block diagram form another embodiment of the telemetry system of the present invention.

The foregoing features are embodied in the telemetry system of FIG. 12 wherein reference character 53 designates the source of the light beam to be modulated, such as a laser. Laser beam 30 is directed through polarizer 31, Kerr cell modulator 54 and analyzer 32. Detector 55 detects the variations in intensity of output beam 39 and converts them into electrical signals that are transmitted to utilization device 56 such as an oscilloscope. Again, polarizer 31 and analyzer 32 are crossed Glan prisms. Note that the light beam 57 exiting from polarizer 31 passes through modulator 54 at an angle of 75° with the electro-magnetic signal wave propagating therethrough and that only one pass $48_1$ is made. The signal from signal source 58 is applied through input section 47 to modulator 54. Where light source 53 provides multiple wave lengths, such as an argon-ion laser, the display on oscilloscope 56 will be similar in appearance to the curve of FIG. 4.

Figure 13:
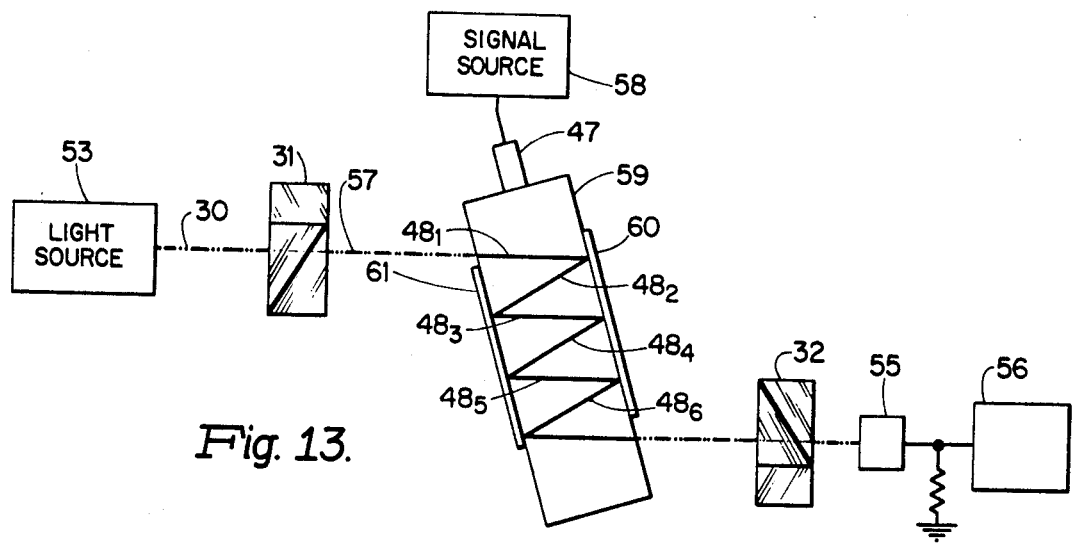
FIG. 13 illustrates schematically and in partially block diagram form still another embodiment of the telemetry system of the present invention.

FIG. 13 illustrates the system of FIG. 12 modified for multiple reflection of the light beam within modulator 59. This can be accomplished by utilizing exterior mirrors, or as shown, by making the glass side walls of modulator 59 reflective at areas 60 and 61.

Figure 14:
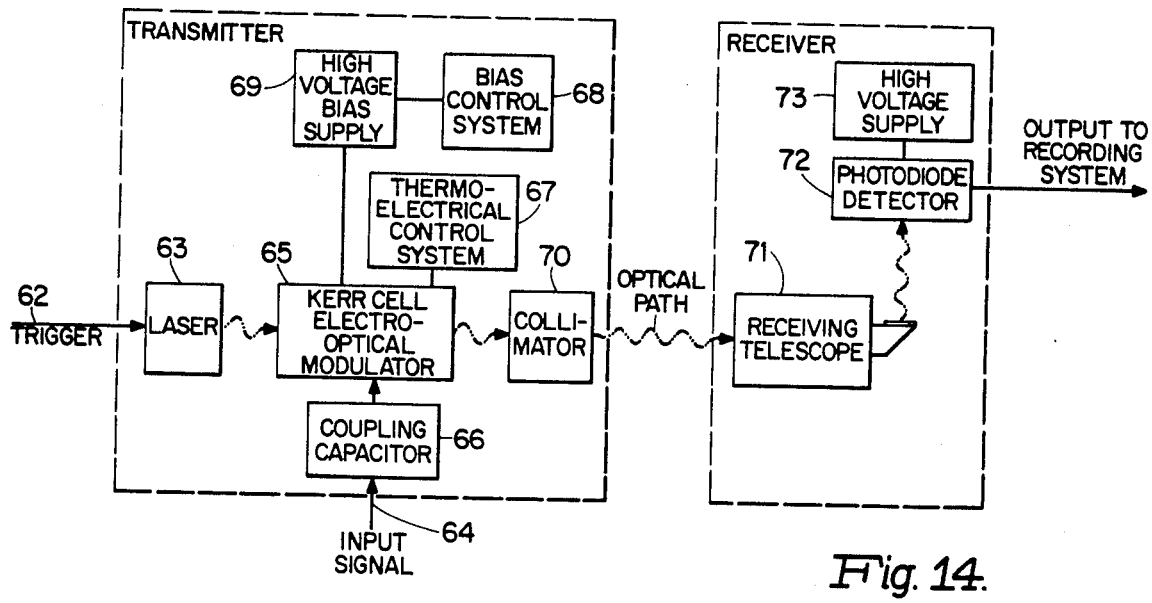
FIG. 14 shows a block diagram of an operating telemetry system utilizing the present invention.

FIG. 14 illustrates in block diagram form the major components of the telemetry system of the present invention. Note that trigger signal 62 actuates laser 63 before input signal 64 is applied to modulator 65 through coupling capacitor 66. Thermoelectrical control system 67 maintains the temperature of modulator 65 constant to avoid changes in its response function. Bias control system 68 maintains the output of bias supply 69 constant. Finally, collimator 70 expands the beam diameter of the modulated light beam to about three inches to decrease the beam divergence and to more nearly match the optimum aperture for atmospheric transmission. The receiving telescope 71 and associated optics collect the transmitted beam, adjust its diameter and direct it onto photodiode detector 72 which is maintained operable by high voltage supply 73. The output of photodiode detector 72 is then transmitted to a recording system.

Figure 15:
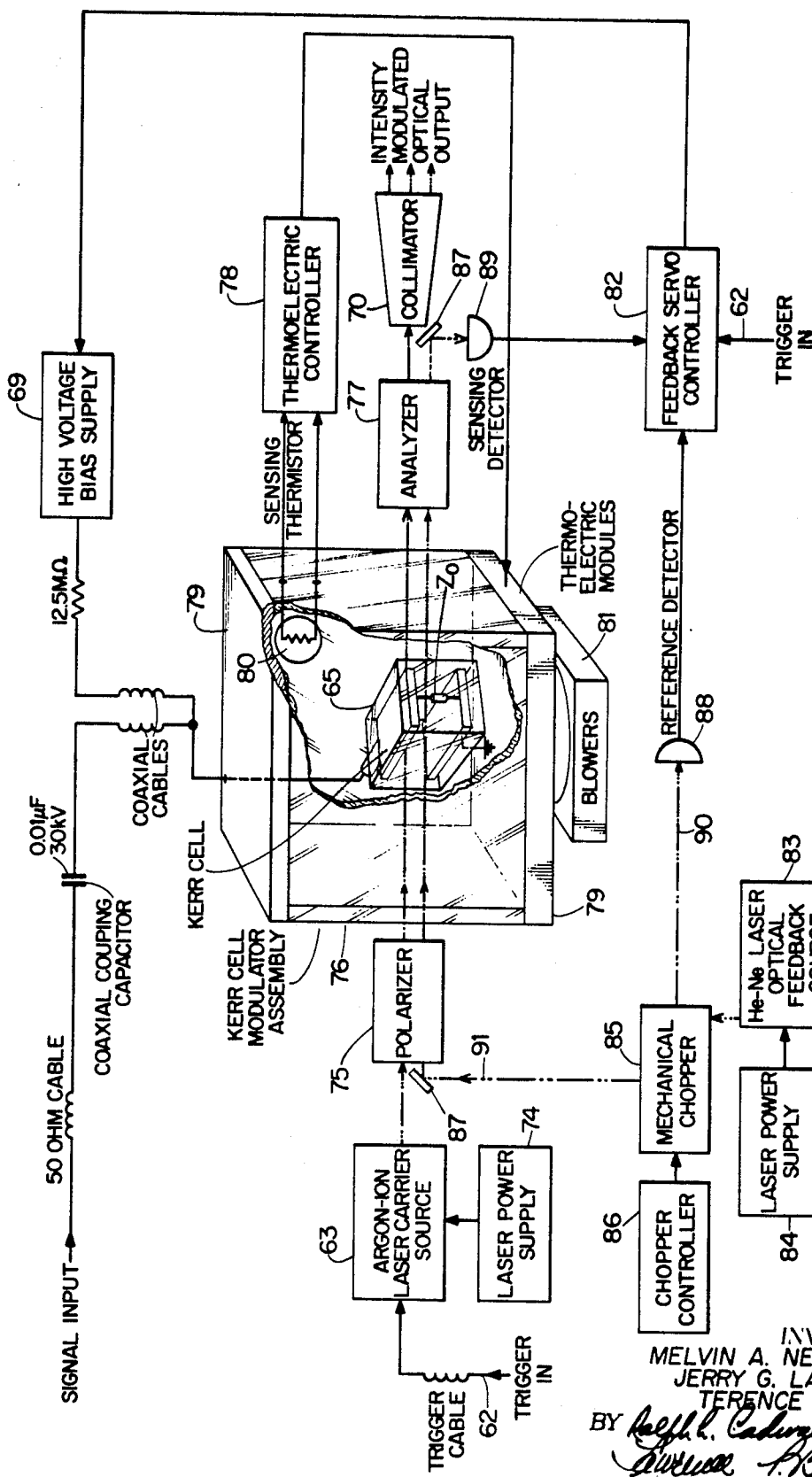
FIG. 15 shows a detailed block diagram of the transmitter components of the system of FIG. 14.

FIG. 15 illustrates in greater detail the components of the transmitter of FIG. 14. Note that laser power supply 74 maintains laser 63 in a condition to be actuated by trigger signal 62. The output beam of laser 63 passes through polarizer 75, environmental chamber 76, Kerr cell modulator 65, analyzer 77 and collimator 70. The laser beam may make one path through Kerr cell modulator 65 or a plurality of reflected paths as desired. Note, too, that the velocities of propagation of the light beam and the electromagnetic wave may be matched as heretofore described.

Environmental chamber 76 contains an inert liquid bath surrounding modulator 65. The temperature of this liquid bath is maintained constant because the response function of modulator 65 shifts significantly with small changes in temperature. Thermoelectric control system 67 maintains the desired temperature to within a few tenths of one degree and comprises thermoelectric controller 78 interposed between thermoelectric modules 79 mounted on the sides of environmental chamber 76 and sensing thermistor 80 placed in the liquid bath. Continuously operating blowers 81 directed towards modules 79 helped assure uniform heating and cooling of chamber 76.

Bias control system 68 serves to maintain the quiescent transmission of modulator 65 to within 5 percent of the desired value by controlling the bias voltage level. Referring for a moment to FIG. 3, this is just another way of saying that the relative light intensity at the bias point is maintained constant to within 5 percent of the desired value. Bias control system 68 comprises feedback servo controller 82 and an error signal generating system which utilizes another laser such as the He-Ne laser 83. When laser power supply 84 is actuated, laser 83 produces a continuous laser beam that is chopped into a series of light pulses by a chopper system comprising mechanical chopper 85 and chopper controller 86. This system may consist of a simple motor-driven chopper wheel. Associated with mechanical chopper 85 is a device for dividing the foregoing laser pulses into two components, reference component 90 and error component 91. A conventional splitter is used to accomplish this. Reference component 90 impinges on reference detector 88 producing a series of reference electrical pulses that are applied to controller 82. Suitable optics, such as mirrors 87, direct error component 91 through polarizer 75, Kerr cell modulator 65, and analyzer 77, into sensing detector 89 which produces a series of electrical pulses that are also applied to controller 82. Relative amplitude of these electrical pulses is determined by the transmission of the Kerr cell modulator 85 according to the bias voltage applied to it. Controller 82 compares this series of pulses with the series of reference pulses and produces an error signal which is applied to high voltage bias supply 69 to control the bias voltage applied to Kerr cell modulator 65. Either reference component 90 or controller 82 may be adjusted to set the desired operating bias voltage. Note that error component 91 is directed through Kerr cell modulator 65 parallel to and displaced from the main laser beam exiting from laser source 63. Since the input signal will also modulate error component 91 an erroneous error signal could be developed by controller 82 were not some means provided to disable controller 82 when an input signal is applied. This is done by adjusting the response time of controller 82 to be so much longer than the duration of the input signal 62 that it is not affected by it.

Figure 16:
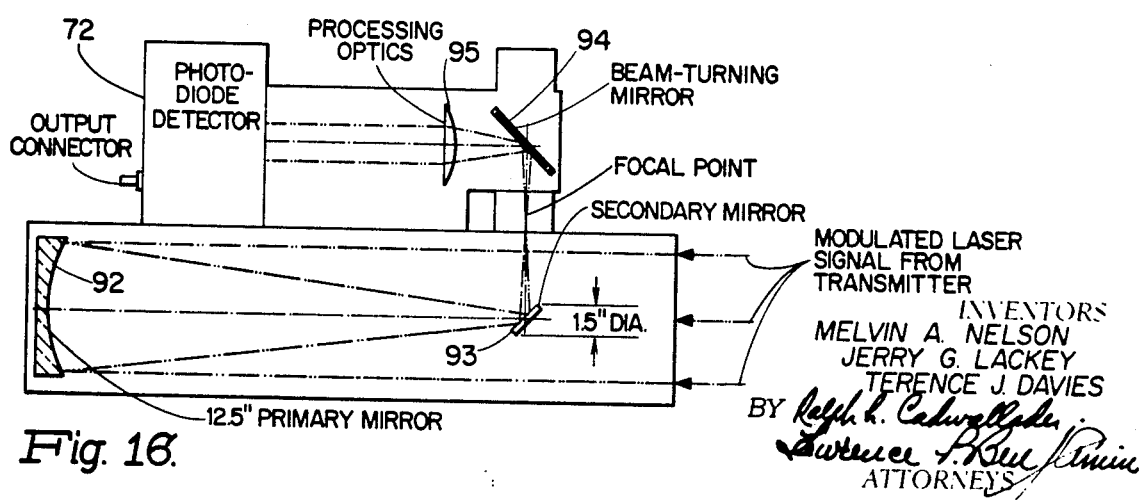
FIG. 16 shows a diagram of the receiver optical components of the system of FIG. 14.

The intensity modulated signal from collimator 70 traverses the optical path between the transmitter and receiver (see FIG. 14) and impinges upon receiving telescope 71 which may comprise a 12 ½ inch Newtonian telescope having primary mirror 92, as illustrated in FIG. 16. Mirror 92 focuses the laser signal onto an optical system which directs it onto the photosensitive surface of photodiode detector 72. In FIG. 16 an example of a suitable optical system is illustrated and comprises secondary mirror 93, beam-turning mirror 94 and processing optics 95 which adjusts the diameter of the modulated laser beam.

While the present invention has been described with reference to certain specific embodiments only, it will be obvious to those skilled in the art that it is not so limited but is susceptable to various changes and modifications without departing from the spirit and scope of the invention.

What is claimed is:

1. A Kerr cell system for modulating a laser beam comprising:
   a laser beam;
   a polarizer and an analyzer means;
   a Kerr cell modulator containing a parallel plate transmission line immersed in birefringent liquid, the Kerr cell modulator, the polarizer and analyzer being so disposed that the laser beam from the laser passes first through the polarizer, then the modulator and finally exits from the analyzer; said modulator having two parallel mirrored surfaces positioned so that the laser beam traverses the modulator a plurality of times; said laser beam being directed into the modulator to intersect an electromagnetic signal wave propagating along the parallel plate transmission line at an angle equal to $$\cos^{-1} \frac{n}{\sqrt{e}}$$

where $n$ and $e$ are the index of refraction and the dielectric coefficient of the birefringent liquid; said angle being approximately 75°;

said polarizer, Kerr cell modulator and analyzer being so oriented that the intensity of the laser beam exiting from the polarizer is minimized when the modulation is zero;

an environmental chamber containing a liquid bath in which the Kerr cell modulator is immersed;

a thermoelectrical control system having a temperature sensing element immersed in the liquid bath, a thermoelectric controller connected to the temperature sensing element and a plurality of thermoelectrical modules disposed in thermal contact with the environmental chamber and a sensing thermistor placed in the liquid bath for maintaining the temperature of the modulator constant;

a high voltage bias supply for applying a bias voltage to the parallel plate transmission line;

a system for controlling the bias voltage having a beedback controller means, a reference component and an error component of the laser beam, means for directing the error component through the Kerr cell modulator without interfering with the main laser beam and means for comparing the error component that exits from the modulator with the reference component to produce an error signal for controlling the bias voltage; and a receiving telescope for receiving the transmitted laser beam, directing it onto a photodiode detector which transmits a signal to an output utilization means.

* * * * *